Dec. 18, 1928.
H. D. ALGYRE
PIPE COUPLING
Filed May 6, 1927
1,696,134
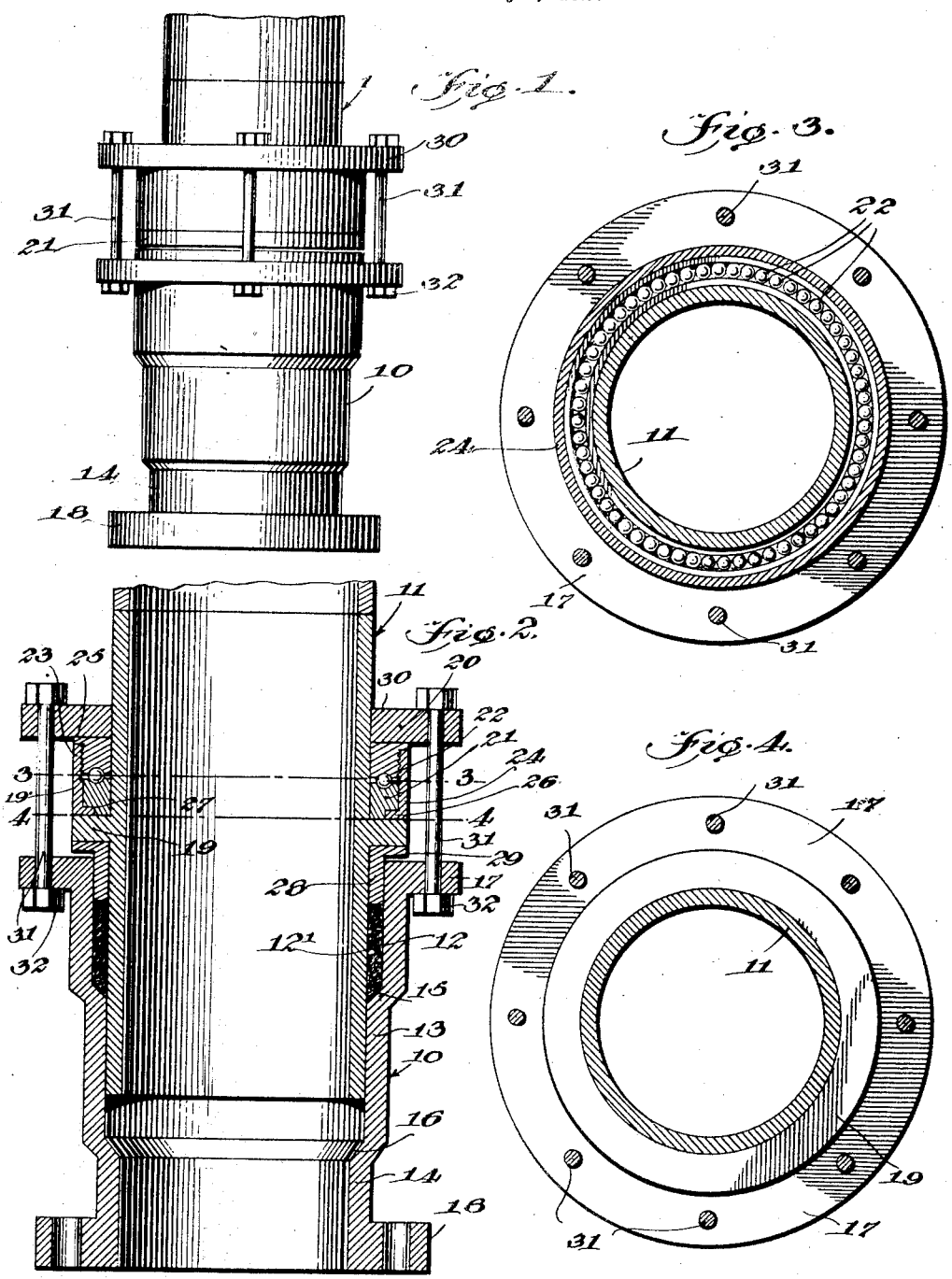
WITNESSES
INVENTOR
H. D. Algyre
BY
ATTORNEYS Patented Dec. 18, 1928.

1,696,134

UNITED STATES PATENT OFFICE.

HARRY D. ALGYRE, OF HOLDENVILLE, OKLAHOMA.

PIPE COUPLING.

Application filed May 6, 1927. Serial No. 189,330.

This invention relates to improvements in pipe couplings.

Throughout the oil fields and in many other instances it is very difficult to obtain a solid foundation on which to install the usual high pressure slush pumps used in connection with rotary drill outfits. When a pump of this character is in operation the vibration is so great that it is ofttimes impossible to keep the screwed or threaded connections of the pump suction pipe tight enough to prevent them from leaking air. Any substantial quantity of air getting into the suction pipe renders the pump practically inoperative. In almost every case in an oil field, where continuous drilling service is required, it is necessary to install two pumps so that one can be repaired while the other is in operation.

In view of the foregoing it is the purpose of this invention to provide a pipe coupling in which all screwed or threaded connections are eliminated, and that will serve the purpose of a suction pipe connection for pumps of the character heretofore defined or the like, without a possibility of leakage of air into the pipe.

It is also within the scope of the objects of the invention that the coupling is durable and simple in construction.

Other objects relating to details of construction, combination and arrangement of parts will hereinafter appear in the detail description to follow.

The invention is illustrated by way of example in the accompanying drawings, in which:

Figure 1 is a view in elevation of a coupling of this invention,

Figure 2 is a central longitudinal section through the coupling, and

Figures 3 and 4 are transverse sectional views taken substantially on the lines 3—3 and 4—4 of Figure 2.

Referring to the drawings more specifically 10 indicates generally the female member of the coupling which is in the form of a nipple, and 11 indicates the male member which is in the form of a sleeve or pipe section. The member 10 is sectionally reduced toward one end thus providing the three sections 12, 13 and 14 of different diameters, and providing the two inner shoulders 15 and 16, and the exterior diameter of the member 11 is such as to conform preferably to the diameter of the intermediate section 13, whereby an annular space or gland is formed around the member 11 by the greater diameter of the section 12 for the reception therein of a suitable packing 12'. The member 10 is further provided at its ends with the outwardly bolting flanges 17 and 18 respectively, each flange being provided with bolt receiving openings as shown.

Member 11 is preferably of the same diameter throughout its length and is formed intermediate its ends with an outwardly extending annular flange 19. The member 10 is adapted to receive the sleeve and section 13 of member 10 forms a close fit about the associated end portion of sleeve 11.

Upon the annular flange 19 of the sleeve 11 there is seated a bearing unit generally indicated by the reference character 19'. This bearing unit comprises two ring members 20 and 21 with opposing surfaces grooved for receiving ball bearings 22. The ring member 20 is provided with a reduced portion 23 upon which is threaded a sleeve member 24. The outer surface of sleeve 24 is flush with portion 25 of the ring 20; and the lower end of the sleeve is formed with an inwardly extending annular flange 26 which is adapted to fit loosely within an annular offset 27 formed in the associated end of the ring 21.

The sleeve 11 is surrounded by a sleeve or bushing 28 which is adapted to fit within the larger end portion 12 of nipple 10, and acts to retain the packing 12' under compression at all times to prevent leakage from around the joint. This bushing 28 is formed with a flange 29 which is disposed between the inner flanged end 12 of nipple 10 and flange 19 of the sleeve 11. A collar 30 is fitted loosely about the sleeve or pipe section 11 and adapted to seat upon the bearing unit 19'. The ring or collar 30 is provided with suitable bolt receiving openings. Bolts 31 extend between the flange 17 of member 10 and the ring or collar 30. The bolts 31 are provided with nuts 32 whereby the collar 30 may be drawn toward the flange 17.

In the use of the coupling heretofore described, the pipe section or sleeve 11 may have its outer end terminate in an elbow if desired. The outer end of sleeve 11 may be connected to a pipe by welding and thus avoid joints of any kind. If a valve is necessary in the suction pipe, a flanged valve can be used and the companion flanges for said valve welded to the pipe, one each side of the valve.

With the parts of the coupling thus provided and secured in assembled relation by the bolts 31, the pipe section or sleeve 11 is freely turnable within the nipple 10. The bolts 31 are to be tightened sufficiently to hold the parts in workable relation, which allows for a desired turning movement of the member 11 within the nipple 10, and, at the same time, to force the bushing 28 against the packing 12', whereby an air tight coupling is effected between the members 10 and 11.

Without further description, it is thought that the features and advantages of the invention will be readily apparent to those skilled in the art, and it will of course be understood that changes in the form, proportion and minor details of construction may be resorted to, without departing from the spirit of the invention or its scope as claimed.

I claim:

A pipe coupling comprising a nipple having sectional reduced portions toward one end, a pipe section adapted to be extended into the larger end of the nipple and to closely fit within the intermediate of said reduced portions thereof, a packing surrounding said pipe section and partially filling the larger of the said reduced portions, an annular flange about the pipe section, a bushing surrounding said pipe section and seated within the open end of the larger of said sectional reduced portions to confine said packing within the latter, an annular flange at the outer end of said bushing interposed between the outer end section of the nipple and said annular flange on said pipe section, an annular ball retaining raceway surrounding said pipe section and seated against the outer side of the annular flange on the latter, an annular collar surrounding said pipe section and seated against the outer side of said raceway, and means engageable with the larger end of said nipple and said collar for securing the parts together.

HARRY D. ALGYRE.